United States Patent [19]
Brennan et al.

[11] Patent Number: 6,011,111
[45] Date of Patent: Jan. 4, 2000

[54] HYDROXY-PHENOXYETHER POLYMER THERMOPLASTIC COMPOSITES

[75] Inventors: David J. Brennan; Jerry E. White; Daryl R. Calhoun, all of Midland, Mich.

[73] Assignee: The Dow Chemical Company, Midland, Mich.

[21] Appl. No.: 08/138,300

[22] Filed: Oct. 18, 1993

[51] Int. Cl.$^7$ .............................. C08K 3/40; C08K 3/04
[52] U.S. Cl. .................. 524/601; 524/494; 524/495; 524/611; 528/96; 528/97; 528/99
[58] Field of Search .................... 524/601, 494, 524/495, 611; 528/96, 97, 99

[56] References Cited

U.S. PATENT DOCUMENTS

| | | | |
|---|---|---|---|
| 3,843,605 | 10/1974 | Schmidt et al. | 528/89 |
| 4,048,141 | 9/1977 | Doorakian et al. | 528/89 |
| 4,105,634 | 8/1978 | Hanson et al. | 526/65 |
| 4,122,067 | 10/1978 | Anderson | 528/89 |
| 4,130,549 | 12/1978 | Ueno et al. | 528/93 |
| 4,340,713 | 7/1982 | Davis et al. | 528/89 |
| 4,438,254 | 3/1984 | Doorakian et al. | 528/89 |
| 4,480,082 | 10/1984 | McLean et al. | 528/103 |
| 4,501,856 | 2/1985 | Harpell et al. | 525/240 |
| 4,528,356 | 7/1985 | Allen | 528/89 |
| 4,533,693 | 8/1985 | Wolfe et al. | 524/417 |
| 4,568,735 | 2/1986 | Li | 528/89 |
| 4,608,404 | 8/1986 | Gardner et al. | 523/400 |
| 4,634,757 | 1/1987 | Marshall | 528/89 |
| 4,657,954 | 4/1987 | Watanabe et al. | 523/459 |
| 4,732,958 | 3/1988 | Jackson et al. | 528/89 |
| 4,737,553 | 4/1988 | Gannon et al. | 525/481 |
| 4,933,420 | 6/1990 | Pham et al. | 528/89 |
| 4,992,228 | 2/1991 | Heck et al. | 264/135 |
| 5,068,268 | 11/1991 | Dewhirst | 523/445 |
| 5,109,099 | 4/1992 | Pham et al. | 528/89 |
| 5,115,075 | 5/1992 | Brennan et al. | 528/99 |
| 5,134,218 | 7/1992 | Brennan et al. | 528/99 |
| 5,143,998 | 9/1992 | Brennan et al. | 528/99 |
| 5,164,472 | 11/1992 | White et al. | 528/97 |
| 5,218,075 | 6/1993 | Brennan et al. | 528/99 |
| 5,246,751 | 9/1993 | White et al. | 428/35.4 |

FOREIGN PATENT DOCUMENTS 0 249 262  12/1987  European Pat. Off. .

*Primary Examiner*—Terrel Morris
*Assistant Examiner*—John J. Guarriello
*Attorney, Agent, or Firm*—Nemia C. Damocles

[57] ABSTRACT

A thermoplastic composite is prepared by applying a hydroxy-phenoxyether polymer onto the surface of reinforcing fibers or by the in-situ polymerization of mixtures of diepoxides and difunctional species in the presence of reinforcing fibers. The composites can be molded into shaped articles useful for structural materials and parts by conventional thermoforming or other fabrication techniques.

14 Claims, No Drawings

HYDROXY-PHENOXYETHER POLYMER THERMOPLASTIC COMPOSITES

BACKGROUND OF THE INVENTION

This invention relates to fiber-reinforced composites and processes for making them.

Composites are well known in the art and are described, for example, in Kirk-Othmer Ency. Chem., Tech.—Supp., *Composites, High Performance*, pp. 260–281 (J. Wiley & Sons 1984). A composite typically comprises a plurality of fibers (reinforcing fibers) embedded in a plastic (the matrix). Typically, the fibers give strength and/or stiffness to the composite, and the matrix maintains fiber orientations and spacings, transmits shear loads between layers of fibers so that they resist bending and compression and protects the fiber from surface damage.

Current matrix materials include the thermosets, such as polyesters, epoxy resins, phenolic, vinyl ester, polyimide, and silicone. The thermosets provide good chemical environmental durability, dimensional stability and good high temperature properties, but they are brittle, have limited shelf life and are time-consuming to process. Some thermoplastic resins are also used in composites, such as, for example, polyetheretherketone (PEEK) and thermoplastic polyimide. The polyimide made in an uncrosslinked thermoplastic form by a condensation reaction has lower use temperature than the thermoset polyimide. The polyetheretherketone is expensive and has lower use temperature than epoxy. Composites prepared from the reaction product of a diglycidyl ether monomer and a multifunctional amine curing agent are also known. However, since the multifunctional curing agent causes the resulting polymer to crosslink, such composites are typically brittle and cannot be reshaped after fabrication. Metal, carbon and ceramic matrix composites are also known. However, ceramic and carbon matrix materials are expensive and brittle, and metal matrix materials are heavier than polymer matrix materials.

It would be desirable to provide a fiber-reinforced composite that is as processable as conventional epoxy thermosets but has thermoplastic-like thermoformability when fully cured.

SUMMARY OF THE INVENTION

In a first aspect, this invention is a thermoplastic composite comprising a fiber-reinforced hydroxy-phenoxyether polymer matrix.

In a second aspect, this invention is a process for making a thermoplastic composite which comprises reacting in-situ, a low viscosity mixture of a diepoxide with a difunctional species in the presence of reinforcing fibers.

In a third aspect, this invention is a process for making a thermoplastic composite which comprises applying a hydroxy-phenoxyether polymer onto the surface of reinforcing fibers.

Composites of the present invention and shaped articles containing them are useful for structural materials and parts.

DETAILED DESCRIPTION OF THE INVENTION

For the purposes of this invention, a fiber is an elongated body whose length dimension is much greater than the transverse dimensions of width and thickness. Generally, the fiber has an aspect ratio of at least about 5, preferably at least about 10, and a length of at least about 0.1 inch, preferably at least about 0.25 inch. The fiber can be continuous, or chopped fibers having an average length of up to about 18 inches, preferably up to about 10 inches, more preferably up to about 4 inches. Fiber diameters in the range from about 1 to about 1000 microns are generally useful. Accordingly, the term fiber includes monofilament fiber, multifilament fiber, ribbon, strip, a plurality of any one or combinations thereof and the like having regular or irregular cross-section. A plurality of fibers can be grouped together to form a twisted or untwisted yarn. The fibers or yarn may be formed as a felt, knitted, woven (plain, basket, satin and crow feet weaves, etc.), or formed into a fabric in any of a variety of conventional techniques. The fibers may also be formed into "nonwoven" fabrics, such as, for example, continuous strand random mats, by such conventional techniques.

Fibers which can be employed in the process of the present invention for preparing thermoplastic composites are described in numerous references, such as, for example, U.S. Pat. No. 4,533,693; Kirk-Othmer Ency. Chem. Tech., *Aramid Fibers*, 213 (J. Wiley & Sons 1978); Kirk-Othmer Ency. Chem., Tech.—Supp., *Composites, High Performance*, pages 261–263; Ency. Poly. Sci. & Eng. The fibers can be of varying composition, provided that they do not melt as a composite is made therewith and, in general, are chosen so that the fibers provide improvements in physical properties, such as tensile strength, flexural modulus, electrical conductivity and the like. Thus, high flexural modulus organic polymers such as polyamides, polyimides, aramids and the like, metals, glass and other ceramics, carbon fibers, graphite fibers, and the like are suitable fiber materials. Examples of glass fibers, include E-glass and S-glass. E-glass is a low alkali, aluminum-borosilicate composition with excellent electrical properties and good strength and modulus. S-glass is a magnesium-aluminosilicate composition with considerably higher strength and modulus. Fiber rovings are also useful. A roving consists of a number of continuous yarns, strands, or tows collected into a parallel bundle with little or no twist.

As used herein, the term "hydroxy-phenoxyether polymer" means a polymer having aromatic ether moieties in its backbone chain and pendant hydroxyl groups. Hydroxy-phenoxyether polymers which can be employed in the practice of the present invention for preparing thermoplastic composites include:

(1) hydroxy-functional polyethers having repeating units represented by the formula:

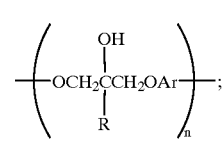

(2) amide- and hydroxymethyl-functionalized polyethers having repeating units represented by the formula:

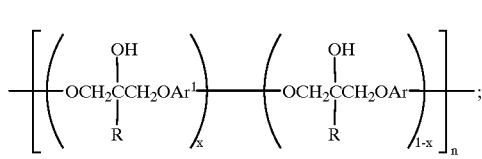

(3) hydroxy-functional poly(ether sulfonamides) having repeating units represented by the formula:

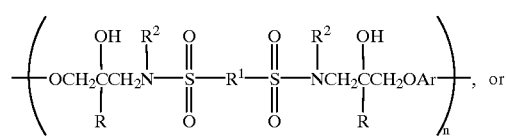
IIIa

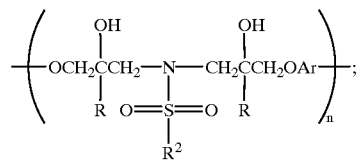
IIIb (4) poly(hydroxy amide ethers) having repeating units represented independently by any one of the formulae:

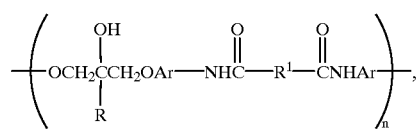
IVa

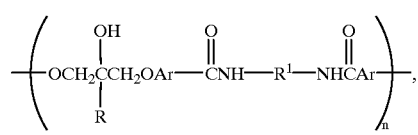
IVb or

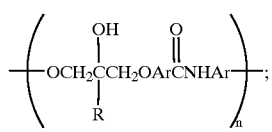
IVc (5) poly(hydroxy ester ethers) having repeating units represented by the formula:

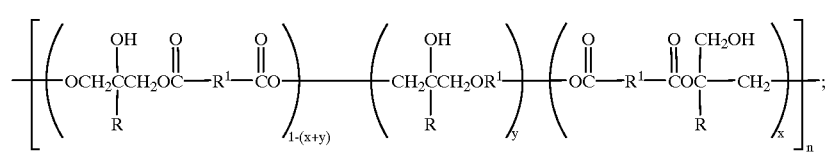
V (6) poly(hydroxy amide ethers) having repeating units represented by any one of the formulae:

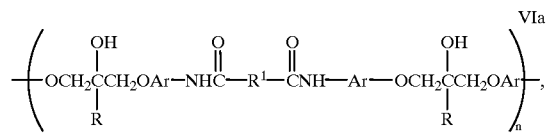
VIa

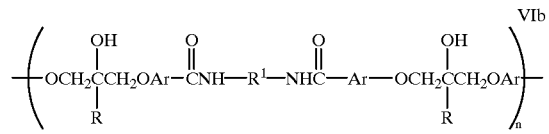
VIb or

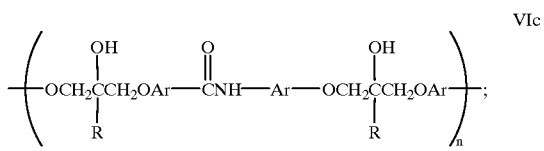
VIc (7) polyetheramines having repeating units represented by the formula:

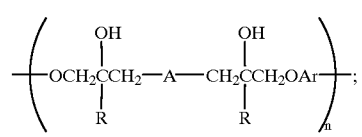
VII and (8) hydroxy-phenoxyether polymers having repeating units represented by the formula:

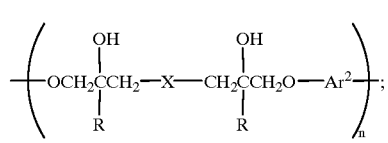
VIII wherein each Ar individually represents an unsubstituted divalent aromatic moiety, substituted divalent aromatic moiety or heteroaromatic moiety, or a combination of different unsubstituted divalent aromatic moieties, substituted divalent aromatic moieties or heteroaromatic moieties; R is individually hydrogen or a monovalent hydrocarbyl moiety; each $Ar^1$ is a divalent aromatic moiety or combination of divalent aromatic moieties bearing amide or hydroxymethyl groups; $R^1$ is individually a predominantly hydrocarbylene moiety, such as an unsubstituted divalent aromatic moiety, substituted divalent aromatic moiety, divalent heteroaromatic moiety, divalent alkylene moiety, substituted divalent alkylene moiety or divalent heteroalkylene moiety or a combination of such moieties; $R^2$ is individually a monovalent hydrocarbyl moiety; A is a divalent amine moiety or a combination of different divalent amine moieties; X is a divalent amine, an arylenedioxy, an arylenedisulfonamido or an arylenedicarboxy moiety or combination of such moieties; and $Ar^2$ is a "cardo" moiety represented by any one of the formulae:

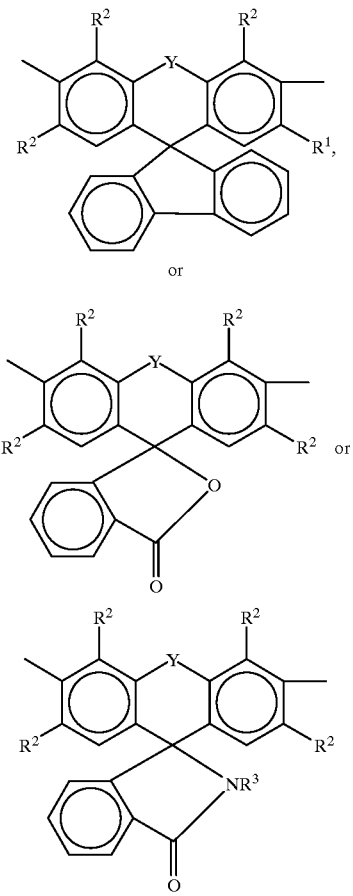

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0; and y is 0 to 0.5.

The term "predominantly hydrocarbylene" means a divalent radical that is predominantly hydrocarbon, but which optionally contains a minor amount of heteroatomic moiety such as oxygen, sulfur, imino, sulfonyl, sulfoxyl, and the like.

The hydroxy-phenoxyether thermoplastics commercially available from Phenoxy Associates, Inc. can also be employed in the practice of the present invention for preparing thermoplastic composites. These hydroxy-phenoxyether polymers are the condensation reaction products of a dihydric polynuclear phenol, such as bisphenol A, and an epihalohydrin and have the repeating units represented by Formula I wherein Ar is an isopropylidene diphenylene moiety. A process for preparing these polymers is described in U.S. Pat. No. 3,305,528, incorporated herein by reference in its entirety.

Generally, the hydroxy-phenoxyether polymers are prepared by reacting a difunctional species (i.e., a species having two reactive groups), such as a dihydric phenol, with a diepoxide (i.e., a compound having two epoxide functionalities) under conditions sufficient to cause the hydroxyl moieties to react with the epoxy moieties to form ether linkages. These polymers and processes for preparing them are described in more detail in U.S. Pat. Nos. 5,164,472, 5,115,075, 5,134,218, 5,171,820, 5,089,588, 5,218,075 and 5,143,998, and copending U.S. application Ser. No. 08/116,023, filed Sep. 2, 1993, all of which are incorporated herein by reference.

Diepoxides which can be employed in the practice of the present invention include the diglycidyl ethers of the dihydric phenols mentioned hereinafter, α,ω-diglycidyloxyisopropylidene-bisphenol-based phenoxy resins (commercially known as D.E.R.™ 300 and 600 series epoxy resins manufactured by the Dow Chemical Company), α,ω-diglycidyloxy tetrabromo isopropylidene-bisphenol-based phenoxy resins, diglycidylamines and diglycidyl esters of dicarboxylic acids. Other diepoxides are described in U.S. Pat. Nos. 5,115,075; 4,480,082 and 4,438,254, and in copending applications U.S. Ser. No. 800,340, filed on Nov. 26, 1991, and U.S. applications Ser. No. 884,673, filed on May 18, 1992, all of which are incorporated herein by reference. Preferred diepoxides are the epoxy resins having an epoxy equivalent weight of from about 100 to about 4000. Most preferred diepoxides are the diglycidyl ethers of bisphenol A, 4,4'-sulfonyldiphenol, 4,4'-oxydiphenol, 4,4'-dihydroxybenzophenone, hydroquinone, 9,9-(4-hydroxyphenyl)fluorene and resorcinol.

Difunctional species which can be employed in the practice of the present invention for preparing thermoplastic composites include compounds having two reactive groups, such as dihydric phenols, dicarboxylic acids, bis-secondary amines, primary amines, dithiols, disulfonamides, and compounds that contain two different functionalities capable of reacting with epoxide groups.

Dihydric phenols which can be employed in the practice of the present invention include the bisphenols described in U.S. Pat. Nos. 5,115,075; 4,480,082 and 4,438,254, and in copending U.S. applications U.S. Ser. No. 800,340, filed on Nov. 26, 1991, and Ser. No. 884,673, filed on May 18, 1992, all of which are incorporated herein by reference. Preferred dihydric phenols include the amide-containing bisphenols such as N,N'-bis(hydroxyphenyl) alkylenedicarboxamides, N,N'-bis(hydroxyphenyl)arylenedicarboxamides, bis(hydroxybenzamido)alkanes or bis(hydroxybenzamide) arenes, N-(hydroxyphenyl)-hydroxybenzamides, 2,2-bis(hydroxyphenyl)acetamides, N,N'-bis(3-hydroxyphenyl) glutaramide, N,N'-bis(3-hydroxyphenyl)adipamide, 1,2-bis(4-hydroxybenzamido)ethane, 1,3-bis(4-hydroxybenzamide)benzene, N-(4-hydroxyphenyl)-4-hydroxybenzamide, and 2,2-bis(4-hydroxyphenyl)-acetamide, 4,4'-isopropylidenebisphenol (bisphenol A), 9,9-bis(4-hydroxyphenyl)fluorene, hydroquinone, resorcinol, 4,4'-sulfonyldiphenol, thiodiphenol, 4,4'-oxydiphenol, 4,4'-dihydroxybenzophenone, tetrabromoisopropylidenebisphenol, dinitrofluorenylidenediphenylene, 4,4'-biphenol, 4,4'-dihydroxybiphenylene oxide, bis(4-hydroxyphenyl)methane, α,α-bis(4-hydroxyphenyl)ethylbenzene, 2,6-dihydroxynaphthylene. More preferred dihydric phenols are 4,4'-isopropylidenebisphenol (bisphenol A), 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dinitrofluorenylidenediphenylene, 4,4'-biphenol, bis(4-hydroxyphenyl)methane, α,α-bis(4-hydroxyphenyl)ethylbenzene and 2,6-dihydroxynaphthylene. Most preferred dihydric phenols are 4,4'-isopropylidenebisphenol (bisphenol A), 4,4'-sulfonyldiphenol, 4,4'-oxydiphenol, 4,4'-hydroxybenzophenone, and 9,9-bis(4-hydroxyphenyl) fluorene.

A process for preparing the amide-containing bisphenols is described in U.S. Pat. No. 5,134,218, incorporated herein by reference.

Dicarboxylic acids which can be employed in the practice of the present invention include phenylene dicarboxylic acids, biphenylene dicarboxylic acids, naphthalene dicarboxylic acids, and alkylene dicarboxylic acids. Preferred dicarboxylic acids include isophthalic acid, terephthalic acid, 4,4'-biphenylene dicarboxylic acid, 3,4'-biphenylene dicarboxylic acid, 3,3'-biphenylenedicarboxylic acid, 2,6-naphthalenedicarboxylic acid, and adipic acid. Most preferred dicarboxylic acids are isophthalic acid, terephthalic acid, 4,4'-biphenylenedicarboxylic acid, and 2,6-naphthalenedicarboxylic acid.

Bis-secondary amines which can be employed in the practice of the present invention include piperazine and substituted piperazines, e.g. dimethylpiperazine and 2-methylamidopiperazine; bis(N-methylamino)benzene, 1,2-bis(N-methylamino)ethane, and N,N'-bis(2-hydroxyethyl)ethylenediamine. Preferred bis-secondary amines are piperazine, dimethylpiperazine, and 1,2-bis(N-methylamino)ethane. The most preferred bis-secondary amine is piperazine.

Primary amines which can be employed in the practice of the present invention include aniline and substituted anilines, e.g. 4-(methylamido)aniline, 4-methylaniline, 4-methoxyaniline, 4-tert-butylaniline, 3,4-dimethoxyaniline, 3,4-dimethyaniline; alkylamines, and substituted alkyl amines, e.g. butylamine and benzylamine; and alkanol amines; e.g. 2-aminoethanol and 1-aminopropan-2-ol. Preferred primary amines are aniline, 4-methoxyaniline, 4-tert-butylaniline, butylamine, and 2-aminoethanol. Most preferred primary amines are 4-methoxyaniline and 2-aminoethanol.

Dithiols which can be employed in the practice of the present invention include those represented by the formula HS—R—SH, wherein R is a predominantly hydrocarbylene moiety or a divalent aromatic moiety.

Preferably, R is (1) alkylene or cycloalkylene which has from 2 to 20 carbons and may contain a heteroatomic moiety such as oxygen, sulfur, sulfonyl, or sulfoxyl or (2) arylene which has from 5 to 25 carbons, may contain a heteroatomic moiety and may be substituted with alkyl, alkoxy, halo, nitro, cyano or cycloalkyl groups. The most preferred dithiol is 4,4'-dimercaptodiphenyl ether (DMPE). Dithiols and processes for preparing them are well known. See, for example, U.S. Pat. No. 3,326,981 and Sutter Scrutch field, *Journal of The American Chemical Society*, Vol. 58, pp. 54, 1936.

Disulfonamides which can be employed in the practice of the present invention include include N,N'-dimethyl-1,2-benzenedisulfonamide, N,N'-dimethyl-1,3-benzenedisulfonamide, N,N'-dimethyl-1,4-benzenedisulfonamide, N,N'-bis(2-hydroxyethyl)-1,2-benzenedisulfonamide, N,N'-bis(2-hydroxyethyl)-1,3-benzenedisulfonamide, N,N'-bis(2-hydroxyethyl)-1,4-benzenedisulfonamide, N,N'-bis(2-hydroxyethyl)-4,4'-biphenyldisulfonamide, N,N'-diphenyl-1,2-benzenedisulfonamide, N,N'-diphenyl-1,3-benzenedisulfonamide, N,N'-1,4-benzenedisulfonamide, N,N'-dimethyl-4,4'-biphenylenedisulfonamide, N,N'-dimethyl-4,4'-oxydiphenylenedisulfonamide, N,N'-dimethyl-4,4'-thiodiphenylenedisulfonamide, N,N'-dimethyl-4,4'-methylenediphenylenedisulfonamide, and N,N'-dimethyl-4,4'-sulfonyldiphenylenedisulfonamide. Preferred disulfonamides include N,N'-dimethyl-1,3-benzenedisulfonamide and N,N'-bis(2-hydroxyethyl)- 4,4'-biphenyldisulfonamide. The disulfonamides are prepared by reactions of primary aliphatic or aromatic amines with bis(chlorosulfonyl) alkanes and arenes. These sulfonamides are described in U.S. Pat. No. 5,149,768, incorporated herein by reference.

Compounds containing two different functionalities capable of reacting with epoxide groups which can be employed in the practice of the present invention include hydroxybenzoic acids, N-alkylamino acids, N-alkylaminophenols, and N-alkylsulfonamidophenols. Preferred are salicylic acid and 4-hydroxybenzoic acid. Most preferred is 4-hydroxybenzoic acid.

A process which can be employed in the practice of the present invention for preparing the thermoplastic composite comprises forming in the presence of reinforcing fibers a hydroxy-phenoxyether polymer by the insitu polymerization of a stoichiometric mixture of a diepoxide and a difunctional species in the presence of the reinforcing fibers. For example, a low viscosity liquid resin can be prepared by mixing the diglycidyl ether of bisphenol A (such as D.E.R.™ 332 epoxy resin) and a difunctional species such as monoethanolamine, in a suitable ratio, such as 1:1. This liquid resin can be applied to the reinforcing fibers such as, for example, by pouring it onto a single- or multi-ply glass/carbon fabric and allowing the resin to penetrate the glass/carbon fabric. The composite part can then be formed by conventional methods, such as by application of heat and pressure. If desired, low levels of crosslinking can optionally be introduced by reacting the diglycidyl ether and the difunctional species in the presence of a multifunctional species, i.e., a species having more than two reactive groups.

The amount of matrix resin applied to the reinforcing fibers can vary over a wide range, depending on the rigidity, shape, heat resistance, wear resistance and other properties desired for the composite, but, in general, the amount is up to about 95 percent by volume of the fibers. Preferably, the amount is from about 10 to about 80, more preferably from about 30 to about 75, and most preferably from about 40 to about 60 percent, based on the total volume of the fibers.

Another process which can be employed in the practice of the present invention for preparing the thermoplastic composite comprises applying a hydroxyphenoxyether polymer, described previously, directly onto the reinforcing fibers by solvent casting. Generally, the process comprises dissolving the polymer in a suitable solvent, pouring the solution on the surface of the reinforcing fibers and then evaporating the solvent by known means such as, for example, by passing the reinforcing fibers containing the polymer solution through an oven, leaving the remaining solid polymer on the reinforcing fibers. Solvent casting is a well known process and is described, for example, in the *Plastics Engineering Handbook* of the Society of the Plastics Industry, Inc., 4th Edition, page 448.

The hydroxy-phenoxyether polymer can also be applied directly onto the reinforcing fibers by compression molding the solid polymer onto the reinforcing fibers at temperatures above the glass transition temperature of the hydroxy-phenoxyether polymer. Generally, the process comprises applying an appropriate amount of the solid polymer on the surface of the reinforcing fibers, loading the reinforcing fibers containing the solid polymer into the lower half of a two-piece mold which provides a cavity having the shape of the desired molded article; bringing together under pressure the two parts of the mold; heating the mold to soften the polymer and form it into a continuous mass having the shape of the cavity; and then hardening the mass by chilling it under pressure and removing the resulting composite from the mold. In general, the time and pressure needed to form the composite and to achieve optimal properties will depend on the chemical composition and molecular weight of the matrix and processing temperature. Advantageously, the solid polymer is applied in powder form, in a substantially even manner on the surface of the reinforcing fibers, by conventional methods, such as by hand, by flour-sifter type apparatus, or by electrostatic spraying. The term "substantially even manner" means that the polymer powder is applied on the surface of the reinforcing fibers in a manner such that the thickness of the powder after melting is uniform throughout the surface of the reinforcing fibers. Generally, the average thickness of the powder, after melting, is from about 5 microns to about 80, preferably from about 15 to about 50, more preferably from about 25 to about 35, microns. Compression molding is a well known process. See, for example, the *Plastics Engineering Handbook* of the Society of the Plastics Industry, Inc., 4th Edition, pages 204–240.

The resin matrix generally occupies much, and preferably substantially all, of the void spaces left by the reinforcing fibers. It is contemplated, however, that some of these void spaces may also be taken by fillers, or other reinforcements.

Various other techniques are suitable for placing the resin matrix around the reinforcing fibers. One such other technique is to coat each fiber, of some of the fibers, with matrix polymer, arrange the coated fibers into the desired network structure and then heat-set the overall structure so as to cause the matrix polymer to flow and occupy the remaining void spaces. Another suitable technique is to arrange layers or other structures of fibers adjacent and between various forms, e.g. films, of the matrix polymer and then to heat-set the overall structure.

The resin matrix of the present invention is thermoplastic and not crosslinked. It has the ability to be reshaped above its glass transition temperature. It is tougher than the thermoset matrix resin since it has the ability to absorb external stresses, while the thermoset matrix resin is more likely to fracture when exposed to applied stress.

Composites of the present invention can be fabricated into shaped articles useful for structural materials and parts by conventional thermoforming or other fabrication techniques.

The following working examples and comparative examples are given to illustrate the invention and should not be construed to limit its scope. Unless otherwise indicated, all parts and percentages are by weight.

EXAMPLE 1

A. Preparation of Hydroxy-phenoxyether Polymer Thermoplastic Composite

To a 100-mL jar is added an epoxy resin (D.E.R.™ 332 epoxy resin, 52.2 g of epoxy equivalent weight=171.9 g/equivalent epoxide, 0.303 mol epoxide) and monoethanolamine (9.2 g, 0.151 mol, 0.301 mol N—H). The mixture is stirred until well-mixed, then half of the resin is poured into a 6"×6"×0.030" thick molding frame on top of a support consisting of a 5 mil aluminum sheet sandwiched between a 3 mil Teflon™ (trademark of du Pont De Nemours & Co., Inc.) sheet (top) and $\frac{1}{16}$" stainless steel plate (bottom). A 6"×6" single-ply glass fiber/carbon fiber woven fabric (32 oz/sq. yd) is placed into the mold. The remainder of the resin is poured on top of the fabric, followed by the placement of (in order) a Teflon™ sheet, aluminum sheet, and stainless steel plate. The assembled molding apparatus is compression molded using the regimen shown in Table I:

TABLE I

| Step | Temp (° F.) | T rate[1] | Force (lb) | F rate[2] | Dwell time (min) |
|---|---|---|---|---|---|
| 1 | 392 | 200 | 500 | 1200 | OFF |
| 2 | 392 | 200 | 5,000 | 1200 | 10 |
| 3 | 392 | 200 | 80,000 | 1200 | 4 |
| 4 | 120 | 200 | 80,000 | 1200 | 10 |
| 5 | END | — | — | — | — |

[1]Temperature change in ° F./minute
[2]Change in force in lb./second

When cool, the 6"×6"×0.035" composite is removed from the molding frame.

B. Thermoforming

The composite prepared in Part A is placed into a convection oven at 200° C. on top of an aluminum block which contains a cylindrical cavity that is 0.75" deep and 2.5" in diameter. After one hour, a cylindrical weight (about 1 kg) with a diameter of 1.5" is placed on the composite part above the cavity. The weight causes the composite to press into the cavity, yielding a shallow depression in the composite that is approximately 0.5" deep and 1.5 to 2.5" wide. The assembly is removed from the oven and allowed to cool below the glass transition temperature of the matrix resin (80° C.). The shape of the composite is maintained when cool.

In contrast, a composite prepared from the same fabric but using a thermosetting epoxy resin-based matrix resin cannot be thermoformed without cracking the matrix.

C. Mechanical Properties

A second 6"×6"×0.035" composite sheet is prepared as described above. Tensile, flexural, and impact properties of the composite are measured in accordance with ASTM test methods D-638, D-790 and D-256, respectively, and the results are shown in Table II. A composite structure of the same thickness is prepared from the same fabric but using a thermosetting epoxy resin-based matrix resin. The mechanical properties of the thermoset composite are similarly measured and the results are also shown in Table II.

TABLE II

| Property | Thermoplastic Composite | Thermoset Composite |
|---|---|---|
| Sample thickness, inches | 0.035–0.040 | 0.035–0.037 |
| Tg[1], ° C. | 78 | Can not be detected |
| Thermoformability | Yes | No |
| Tensile Yield[2], psi | 40,000 | 39,000 |
| Tensile Break[3] psi | 20,000 | 40,600 |
| Tensile Modulus[4], psi | $2.2 \times 10^6$ | $4.0 \times 10^6$ |
| Flexural Modulus[5] pi | $2.2 \times 10^6$ | $2.0 \times 10^6$ |
| Flexural Strength[6], psi | 28,200 | 23,000 |
| Dynatup Impact[7], 0.035" | | |
| Total Energy, ft-lb | 17.3 | 11.5 |
| Maximum Load, lb | 404 | 317 |

[1]Tg - glass transition temperature determined using a DuPont Model 2100 differential scanning calorimeter (DSC) operation in a heating mode at 20° C./minute
[2]Tensile Yield - ASTM D-638
[3]Tensile Break - ASTM D-638
[4]Tensile Modulus - ASTM D-638
[5]Flexural Modulus - ASTM D-790
[6]Flexural Strength - ASTM D-790
[7]Dynatup Impact - ASTM D-376386
[7]Dynatup Load - ASTM D-376386

D. Extraction with Dimethyl Formamide

Specimens of the hydroxy-phenoxyether polymer thermoplastic composite and the epoxy thermoset composite prepared in Part B are suspended in dimethyl formamide. The dimethyl formamide dissolves the hydroxyphenoxyether polymer thermoplastic composite matrix but not the epoxy thermoset matrix, which indicates that the hydroxy-phenoxyether polymer thermoplastic composite is uncrosslinked while the epoxy thermoset matrix is crosslinked.

What is claimed is:

1. A thermoplastic composite comprising reinforcing fibers and a hydroxy-phenoxyether polymer matrix.

2. The thermoplastic composite of claim 1 wherein the hydroxy-phenoxyether polymer is formed by the insitu polymerization of a stoichiometric mixture of a diepoxide and a difunctional species in the presence of the reinforcing fibers.

3. The thermoplastic composite of claim 2 wherein the diepoxide is an epoxy resin having an epoxy equivalent weight of from about 100 to about 10,000.

4. The thermoplastic composite of claim 2 wherein the diepoxide is a diglycidyl ether of bisphenol A, 4,4'-sulfonyldiphenol, 4,4'-oxydiphenol, 4,4'-dihydroxybenzophenone, hydroquinone or 9,9-(4-hydroxyphenyl)fluorene and the difunctional species is a dihydric phenol, dicarboxylic acid, bis-secondary amine, primary amine, dithiol, or disulfonamide.

5. The thermoplastic composite of claim 4 wherein the dihydric phenol is 4,4'-isopropylidene bisphenol (bisphenol A), 4,4'-sulfonyldiphenol, 4,4'-oxydiphenol, 4,4'-dihydroxybenzophenone, or 9,9-bis(4-hydroxyphenyl) fluorene; the dicarboxylic acid is isophthalic acid, terephthalic acid, 4,4'-biphenylenedicarboxylic acid, or 2,6-naphthalenedicarboxylic acid; the bis-secondary amine is piperazine, dimethylpiperazine, or 1,2-bis(N-methylamino) ethane; the primary amine is 4-methoxyaniline or 2-aminoethanol; the dithiol is 4,4'-dimercaptodiphenyl ether; the disulfonamide is N,N'-dimethyl-1,3-benzenedisulfonamide or N,N'-bis(2-hydroxyethyl)-4,4'-biphenyldisulfonamide; and the compound that contains two different functionalities capable of reacting with epoxy groups is salicylic acid or 4-hydroxybenzoic acid.

6. The thermoplastic composite of claim 1 wherein the reinforcing fiber is selected from the group consisting of metals, glass, ceramics, carbon fibers, graphite fibers and high flexural modulus organic polymers.

7. The thermoplastic composite of claim 6 wherein the organic polymer is polyamide, polyimide, aramid, poly (benzothiazole), poly(benzimidazole) or poly(benzoxazole).

8. The thermoplastic composite of claim 1 wherein the hydroxy-phenoxyether polymer is selected from the group consisting of:

(1) hydroxy-functional polyethers having repeating units represented by the formula:

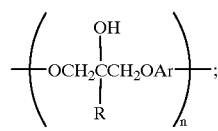

I (2) amide- and hydroxymethyl-functionalized polyethers having repeating units represented by the formula:

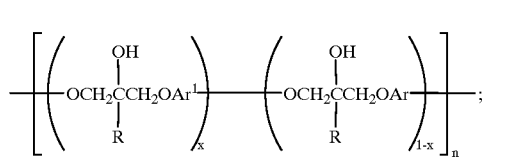

II (3) hydroxy-functional poly(ether sulfonamides) having repeating units represented by the formula:

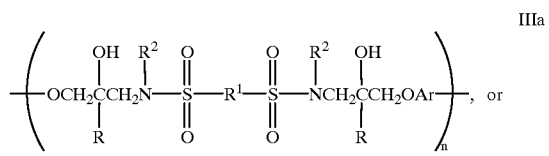

IIIa

IIIb (4) poly(hydroxy amide ethers) having repeating units represented independently by any one of the formulae:

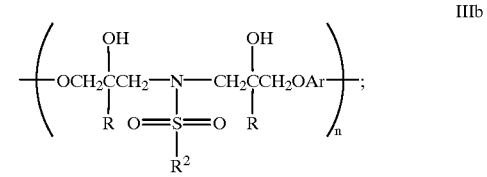

IVa

IVb or

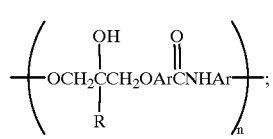

IVc (5) poly(hydroxy ester ethers) having repeating units represented by the formula:

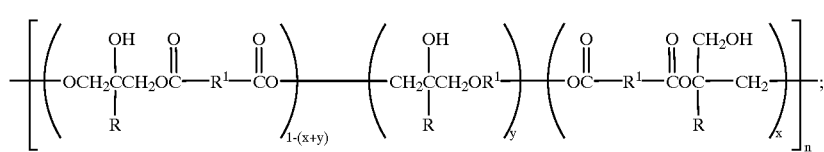

(6) poly(hydroxy amide ethers) having repeating units represented by any one of the formulae:

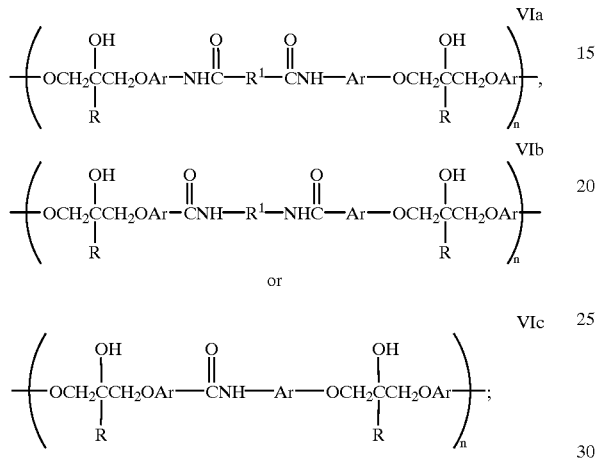

(7) polyetheramines having repeating units represented by the formula:

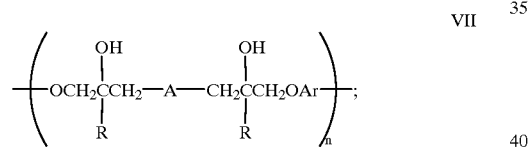

and (8) hydroxy-phenoxyether polymers having repeating units represented by the formula:

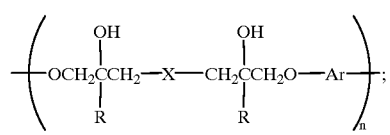

wherein each Ar individually represents a divalent aromatic moiety or heteroaromatic moiety, or a combination of different divalent aromatic moieties, or heteroaromatic moieties; R is individually hydrogen or a monovalent hydrocarbyl moiety; each $Ar^1$ is a divalent aromatic moiety or combination of divalent aromatic moieties bearing amide or hydroxymethyl groups; $R^1$ is individually a predominantly hydrocarbylene moiety; $R^2$ is individually a monovalent hydrocarbyl moiety; A is a divalent amine moiety or a combination of different divalent amine moieties; X is a divalent amine, an arylenedioxy, an arylenedisulfonamido or an arylenedicarboxy moiety or combination of such moieties; and $Ar^2$ is a "cardo" moiety represented by any one of the formulae:

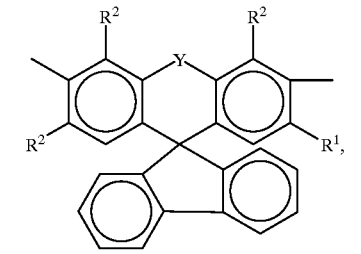

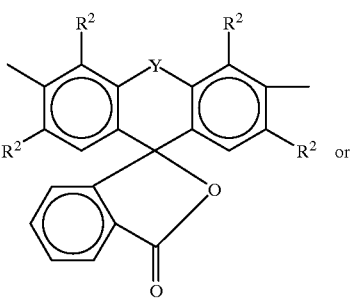

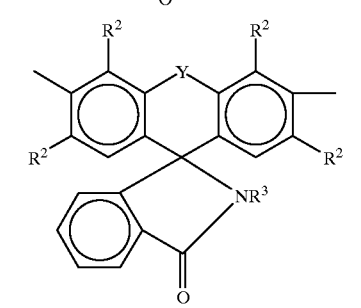

wherein Y is zero, a covalent bond, or a linking group selected from the group consisting of an oxygen atom, a sulfur atom, a carbonyl atom, a sulfonyl group, and a methylene group; n is an integer from about 10 to about 1000; x is 0.01 to 1.0; and y is 0 to 0.5.

9. The thermoplastic composite of claim 8 wherein $R^1$ in the formula is a divalent aromatic moiety, divalent heteroaromatic moiety, divalent alkylene moiety, divalent heteroalkylene moiety or a combination of such moieties.

10. A process for making a thermoplastic composite which comprises applying a hydroxy-phenoxyether polymer onto the surface of reinforcing fibers.

11. The process of claim 10 wherein the hydroxy-phenoxyether polymer is applied onto the reinforcing fibers by the in situ polymerization of a stoichiometric mixture of a diepoxide and a difunctional species in the presence of the reinforcing fibers.

12. The process of claim 10 wherein the hydroxy-phenoxyether polymer is applied onto the reinforcing fibers by solvent casting or compression molding.

13. The process of claim 10 wherein the reinforcing fiber is selected from the group consisting of metals, glass, ceramics, carbon fibers, graphite fibers and high flexural modulus organic polymers.

14. The process of claim 13 wherein the organic polymer is polyamide, polyimide, aramid, poly(benzothiazole), poly(benzimidazole) or poly(benzoxazole).

* * * * *